(12) United States Patent
Vacanti

(10) Patent No.: US 9,000,974 B2
(45) Date of Patent: Apr. 7, 2015

(54) SYSTEMS AND METHODS FOR FREQUENCY-MODULATION CONTINUOUS-WAVE AND PULSE-COMPRESSION TRANSMISSION OPERATION

(71) Applicant: Honeywell International Inc., Morristown, NJ (US)

(72) Inventor: David C. Vacanti, Renton, WA (US)

(73) Assignee: Honeywell International Inc., Morristown, NJ (US)

( * ) Notice: Subject to any disclaimer, the term of this patent is extended or adjusted under 35 U.S.C. 154(b) by 225 days.

(21) Appl. No.: 13/625,785

(22) Filed: Sep. 24, 2012

(65) Prior Publication Data

US 2014/0070985 A1  Mar. 13, 2014

Related U.S. Application Data

(60) Provisional application No. 61/698,903, filed on Sep. 10, 2012.

(51) Int. Cl.
*G01S 7/282* (2006.01)
*G01S 7/35* (2006.01)
(Continued)

(52) U.S. Cl.
CPC ............... *G01S 13/10* (2013.01); *G01S 13/32* (2013.01); *G01S 13/87* (2013.01); *G01S 13/9307* (2013.01)

(58) Field of Classification Search
CPC ............ G01S 7/02; G01S 7/28; G01S 7/282; G01S 7/285; G01S 7/35; G01S 7/352; G01S 13/02; G01S 13/04; G01S 13/06; G01S 13/08; G01S 13/10; G01S 13/24; G01S 13/26; G01S 13/32; G01S 13/34; G01S 13/87; G01S 13/88; G01S 13/93; G01S 13/9307
USPC .............. 342/27, 28, 59, 70–72, 82, 89, 342/104–115, 118, 120, 122, 128–135, 175, 342/195, 200–202
See application file for complete search history.

(56) References Cited

U.S. PATENT DOCUMENTS 2,836,811 A * 5/1958 McArthur ..................... 342/114
2,941,200 A * 6/1960 De Lange et al. ............. 342/132
(Continued)

FOREIGN PATENT DOCUMENTS

EP  0718637 A2  6/1996
JP  2006053054 A  2/2006
JP  2008215937 A  9/2008

OTHER PUBLICATIONS

Examination Report from counterpart European Application No. 13183622.3, dated Feb. 28, 2014, 8 pp.
(Continued)

*Primary Examiner* — Bernarr Gregory
(74) *Attorney, Agent, or Firm* — Shumaker & Sieffert, P.A.

(57) ABSTRACT

Systems and methods for allowing dual-mode radar operation. An exemplary transmission system includes a hybrid coupler that receives a signal produced by a synthesizer and couples the received signal to two output ports. A pulse transmitter receives a pulse transmit-activate signal from a controller, receives an input signal from the hybrid coupler and, if the activate signal has been received, amplifies the received signal based on a predefined desired pulse output transmission setting. A frequency-modulation continuous-wave (FMCW) transmitter receives an FMCW transmit-activate signal from the controller, receives an input signal from the hybrid coupler and, if the activate signal has been received, amplifies the received input signal based on a predefined desired FMCW output transmission setting. An isolator protects the pulse transmitter during FMCW operation and also the FMCW transmitter from receiving power reflected off of pulse transmitter components.

6 Claims, 2 Drawing Sheets

(51) Int. Cl.
*G01S 13/87* (2006.01)
*G01S 13/10* (2006.01)
*G01S 13/32* (2006.01)
*G01S 13/93* (2006.01)
*G01S 7/00* (2006.01)
*G01S 13/00* (2006.01)

(56) References Cited

U.S. PATENT DOCUMENTS

| | | | | |
|---|---|---|---|---|
| 3,140,489 | A | * | 7/1964 | Downie .................. 342/132 |
| 3,188,637 | A | * | 6/1965 | Mortley .................. 342/132 |
| 3,196,437 | A | * | 7/1965 | Mortley et al. .......... 342/132 |
| 3,382,497 | A | * | 5/1968 | Cooley .................. 342/132 |
| 3,383,686 | A | * | 5/1968 | Davis et al. ............ 342/110 |
| 3,390,391 | A | * | 6/1968 | Barbasso, Jr. et al. ... 342/131 |
| 3,688,313 | A | * | 8/1972 | Kern ....................... 342/89 |
| 3,713,154 | A | * | 1/1973 | Kummer ................. 342/107 |
| 4,309,703 | A | * | 1/1982 | Blahut .................... 342/132 |
| 5,130,714 | A | * | 7/1992 | Taylor .................... 342/132 |
| 5,539,410 | A | * | 7/1996 | Zveglich ................. 342/131 |
| 6,426,717 | B1 | * | 7/2002 | Maloratsky ............. 342/122 |
| 6,486,826 | B1 | | 11/2002 | Cramer et al. |
| 6,798,374 | B1 | | 9/2004 | Smith |
| 7,148,840 | B2 | * | 12/2006 | Dooi et al. .............. 342/131 |
| 7,161,527 | B2 | | 1/2007 | Vacanti |
| 7,239,266 | B2 | | 7/2007 | Vacanti |
| 7,362,261 | B2 | * | 4/2008 | Flacke .................... 342/132 |
| 7,616,148 | B2 | * | 11/2009 | Wu et al. ................ 342/28 |
| 7,737,880 | B2 | | 6/2010 | Vacanti |
| 8,410,976 | B2 | * | 4/2013 | Szajnowski et al. ..... 342/131 |
| 2011/0298506 | A1 | | 12/2011 | Salle et al. |
| 2012/0154203 | A1 | | 6/2012 | Vacanti et al. |

OTHER PUBLICATIONS

Extended European Search Report from the counterpart European application No. 13183622.3 dated Jan. 16, 2014. 9 pp.

U.S. Appl. No. 13/625,767 by David C. Vacanti, filed Sep. 24, 2012 and entitled, "Combined FMCW and FM Pulse-Compression Radar Systems and Methods" (27 pages).

Yun-Taek Im et al., "A Pulse-Doppler and FMCW Radar Signal Procsesor for Surveillance," 2011 3rd International Asia-Pacific Conference on Synthetic Aperture Radar (APSAR), IEEE, (Sep. 26, 2011), pp. 1-4.

Response to European Examination Report dated Feb. 28, 2014, from counterpart European Application No. 13183622.3, filed Jun. 11, 2014, 22 pp.

* cited by examiner

SYSTEMS AND METHODS FOR FREQUENCY-MODULATION CONTINUOUS-WAVE AND PULSE-COMPRESSION TRANSMISSION OPERATION

COPENDING APPLICATION

This application claims the benefit of U.S. Patent Application Ser. No. 61/698,903 filed Sep. 10, 2012. This application also incorporates by reference in its entirety U.S. patent application Ser. No. 13/625,767 filed on Sep. 24, 2012.

BACKGROUND OF THE INVENTION

There does not currently exist a radar system that allows both marine and aviation applications to provide a combination of long-range and moderate-range resolution, in addition to very short minimum range (<10 feet) to modest range (5-7 nautical miles (NM)) with very high-range resolution on the order of three to ten feet. Current commercial marine radar systems employ either pulse or pulse-compression methods for moderate (~1 NM) to long-range capability with modest- to high-range resolution. Examples include Honeywell's RDR 4000 nonlinear frequency modulation (NLFM) pulse-compression radar, Kelvin Hughes LFM Pulse Compression Marine Radars, JRS Solid State Marine Radar, NGC/Sperry Marine Solid State Pulse Compression Radar system. Marine radars currently are pulsed (all suppliers) or frequency-modulation continuous-wave (FMCW) (Navico) types of systems.

SUMMARY OF THE INVENTION

The present invention provides systems and methods for allowing dual-mode radar operation. An exemplary transmission system includes a hybrid coupler that receives a signal, produced by a synthesizer, and couples the received signal to two output ports. A pulse transmitter receives a pulse transmit-activate signal from a controller, receives an input signal from a first one of the two output ports of the hybrid coupler and, if the activate signal has been received, amplifies the received input signal based on a predefined desired pulse output transmission setting. A frequency modulation continuous wave (FMCW) transmitter receives an FMCW transmit-activate signal from the controller, receives an input signal from the other output port of the hybrid coupler and, if the activate signal has been received, amplifies the received input signal based on a predefined desired FMCW output transmission setting. An isolator protects the pulse transmitter during FMCW operation and also the FMCW transmitter from receiving power reflected off of pulse transmitter components.

The present invention avoids large mechanical switches (coax or waveguide) that would be required to achieve very low insertion loss. The present invention avoids switch-time limitations when interleaving FMCW and pulse compression mode.

The present invention allows the highest possible efficiency and lowest possible losses when accommodating both transmitters. The present invention allows very short minimum range of just a few meters in FMCW mode, with high range resolution for multiple applications, and permits high-power pulse-compression mode for long-range detection with variable-range resolution.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
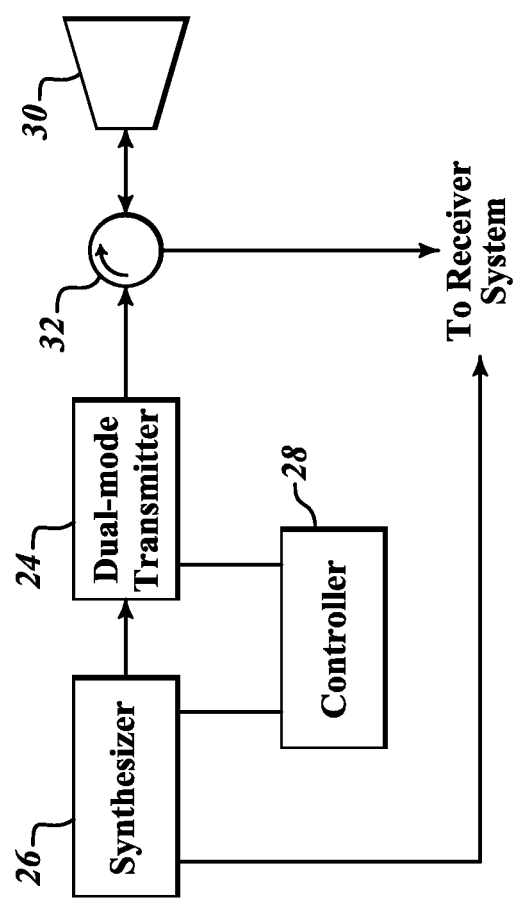
FIGS. 1 and 2 are block diagrams of exemplary transmitter systems formed in accordance with embodiments of the present invention.

FIG. 1 shows a portion of an exemplary radar system 20 for a vehicle (e.g., boat, aircraft) that is configured to provide a dual-mode, low-power radar system. The system 20 induces a dual-mode transmitter 24, a synthesizer 26, a controller 28 (e.g., field-programmable gate array (FPGA)), an antenna 30, and, optionally, a circulator 32. A complete radar system would include other components, such as a digital signal processor and output device.

The transmitter 24 receives a base signal from the synthesizer 26, then generates a transmission signal from the received base signal according to an operational mode (i.e., transmission frequency) determined by the controller 28.

In one embodiment, a user manually sets the operational mode using a user interface associated with the controller 28. In one embodiment, the operational mode is automatically set by the controller 28, based on received information. Exemplary received information includes information about the operational state of the vehicle associated with the system 20.

If the antenna 30 is a transmit/receive antenna, then the circulator 32 is included for the coordination of signals sent from the transmitter 24 to the antenna 30 and signals received at the antenna 30, then sent to a receiver system (not shown).

The first and most obvious method to solve this problem is to suggest the use of simple single-pole, double-throw (SPDT) switches at the input and output of the high-power transmitter so that, in low-power mode, exciter power levels are bypassed around the high-power transmitter and, in high-power pulse mode, the bypass is eliminated and the high-power transmitter is directly connected to the antenna.

However, this method is exceptionally wasteful because it dissipates a substantial amount of the available pulse transmitter power (20 to 30% at a minimum) in the insertion loss of the output switch and requires a set of mechanical coaxial or waveguide switches that add significant size and weight and have a large cost impact. This method also does not allow for rapid interleaving of the transmit waveforms. Rapid continuous switching of mechanical switches (ultra-low loss, high isolation) will also result in high failure rates and low overall mean time between failures (MTBF). Use of PIN diode switches is possible but far higher insertion losses occur with switching limits placed on the maximum transmit power for the diodes. Using switches with any loss requires the transmitter power to be increased, so that the final power delivered to the antenna is maintained at the required level. This dramatically increases cost, size, weight, and power (CSWAP).

Figure 2:
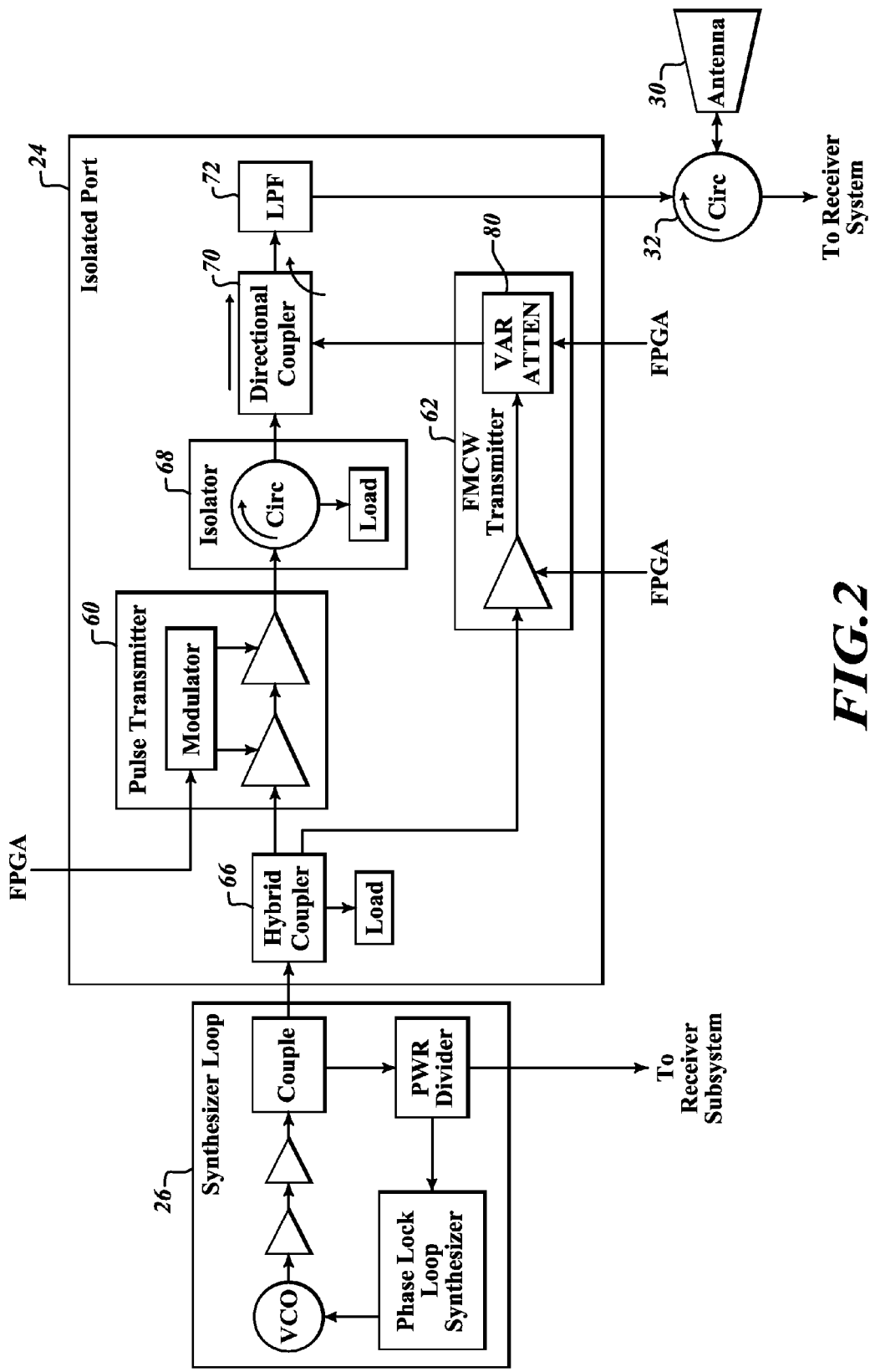

As shown in FIG. 2, the transmitter 24 includes a hybrid coupler 66, a pulsed transmitter 60, an isolator 68, a frequency-modulated continuous-wave (FMCW) transmitter 62, a directional coupler 70 and a lowpass filter (LPF) 72. The hybrid coupler 66 receives a base signal from a synthesizer 26. An exemplary synthesizer includes a direct digital synthesizer (DDS) with a fractional N synthesizer, such as that and others described in copending U.S. patent application Ser. No. 13/625,767 filed on Sep. 24, 2012, which is hereby incorporated by reference.

The synthesizer 26 provides two different signals that determine the operating mode of the transmitter 24. When the synthesizer 26 generates long continuous linear frequency modulation waveforms that resemble a triangle (linear frequency ramp up followed by linear frequency ramp down) with the transmitter 24 operating continuously, then the low power FMCW transmitter 62 is used. In continuous wave mode (FMCW) the waveforms can have durations as long as milliseconds. When high power pulses are required then the synthesizer 26 generates short bursts of linear or non-linear frequency modulation with durations on the order of a few to several microseconds. In the high power pulse mode the high power transmitter path (the pulsed transmitter 60) is operational. Each of these waveforms is typically stored in an FPGA to be used as a suite of possible transmitted waveforms as conditions require.

The low-power transmitter (the FMCW transmitter 62) is protected by the reverse isolation of the directional coupler 70 and an optional variable attenuator 80. The isolator 68 prevents energy from coupling in an undesired direction from the directional coupler 70. When operating in low-power mode (i.e., FMCW transmission mode), the isolator 68 prevents energy from reflecting from the pulsed transmitter 60 that has been switched off.

The FMCW transmitter 62 is protected from high power levels of the high power pulsed transmitter 60 by the reverse isolation of the directional coupler 70 and the variable attenuator 80. The isolator 68 is provided for two reasons: 1) protect the high power pulsed transmitter 60 from a failure in the antenna 30 that would cause large amounts of the transmitter power to be reflected back to the amplifier and potentially cause serious permanent damage; 2) when in the FMCW mode power is coupled primarily in the direction of the output circulator 32 but some of the power is sent towards the high power transmitter 60 that is turned off. Without the isolator 68 that power from the FMCW transmitter 62 will then reflect power back towards the output circulator 32 and will therefore combine with the intended transmit power with undefined phase and amplitude. This could result in large levels of amplitude and phase modulation in the resulting transmitted signal that will cause serious distortion when finally received. This distortion will reduce receiver sensitivity and range resolution. The isolator 68 causes the power that travels in the undesired direction towards the high power transmitter 60 to be absorbed in the load of the isolator 68 and is not reflected back towards the output circulator 32.

The high-power pulsed transmitter 60 is directly connected to the antenna 30 at all times so that the signals produced do not incur any significant insertion losses en route to the antenna 30. Power for the FMCW transmitter 62 is increased to the 1 to 2 watt (W) level with only 0.1-0.2 W being coupled to the antenna 30. The directional coupler 70 transfers power to the output transmission line at a reduced coupling level. That coupling level provides isolation from the very high power transmitter 60 reaching the low power transmitter 62. Typically directional couplers have a FORWARD transfer loss of 3 to 20 dB. So for a 10 dB coupler a 2 Watt transmitter corresponds to 33 dBm, reduced by the 10 dB coupler the directional coupler 33-10 dB=23 dBm or 0.20 Watts sent in the forward direction to antenna 30. The reverse or undesired isolation will be about 15 to 20 dB. That means that a 100 Watt high power transmitter (50 dBm) is reduced 50-20 dB reverse isolation=30 dBm or 1 Watt. The attenuator is then set for 30 dB and the FMCW transmitter 62 will only experience 30 dBm-30 dB=0 dBm or 1 milliwatt. While this is a bit wasteful, this power level is very easily achieved (vs. 40-300 W) at low CSWAP.

By using the hybrid coupler 66 and the directional coupler 70 (or alternately a waveguide directional coupler for transmitters >40 W) "switching" transmit modes can be done as quickly as the modulator/synthesizer can generate appropriate waveforms with very low losses compared to the typical design using Single Pole, Double Throw Switches. The only significant losses in the proposed system are in the input driver stages due to the hybrid isolated power divider (hybrid coupler). These losses, however, are low cost and occur at the <1 W level where overcoming those losses is low CSWAP.

In the present invention, the directional coupler experiences insertion loss and directivity losses typically <0.4 decibel (dB). The hybrid coupler 66 provides continuous load to the synthesizer 26 at all times. The synthesizer 26 is always on so that it is ready to generate any desired waveform. Turning the PLL off or causing the load to change dramatically introduces large changes to the PLL that will cause large changes in output frequency. This instability requires time after the load change to smooth out and produce a stable output. Waiting for the synthesizer to stabilize slows the pulse transmission rate or the switching rate between FMCW and Pulse modes.

In the FMCW mode objects at a very short minimum range of just a few meters can be detected. When in the high-power pulse-compression mode, objects at long range can be detected with variable-range resolution.

In one embodiment, the directional coupler 70 during pulse transmission output provides 10 dB directional coupling towards the antenna 30 (e.g., 30 dBm input and 20 dBm output to the antenna). The load of the directional coupler 70 is sized for pulse transmitter power minus directivity (e.g., 50 dBm−20 dBm=30 dBm peak). The directional coupler 70 has >20 dB coupler directivity to protect the FMCW transmitter 62 (e.g., 50 dBm−20 dB=30 dBm).

In one embodiment FMCW variable attenuator provides ~20 dB of added attenuation. The variable attenuator 80 switches in added attenuation for protection during high-power pulse transmission mode. Also, the variable attenuator 80 may be used to adjust output power in FMCW mode. The variable attenuator 80 is used to precisely control transmit power to just below the self jam level. The FMCW transmitter 62 is biased OFF during high-power pulse mode under control of a control signal sent from the FPGA. The FMCW transmitter 62 is a 2 W CW device that is on only during FMCW mode.

The hybrid coupler 66 includes an isolated load that absorbs power reflected from the "Off FMCW Transmitter" to protect the PLL operation.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method comprising:
   at a hybrid coupler,
   receiving a signal produced by a synthesizer; and
   coupling the received signal to two output ports;
   at a pulse transmitter,
   receiving a pulse transmit-activate signal from a controller;
   receiving an input signal from a first one of the two output ports of the hybrid coupler; and
   amplifying the received input signal if the pulse transmit-activate signal has been received, wherein amplifying is based on a predefined desired pulse output transmission setting;
   at a frequency-modulation continuous-wave (FMCW) transmitter,
   receiving an FMCW transmit-activate signal from the controller;

receiving an input signal from the other output port of the hybrid coupler; and amplifying the received input signal if the FMCW transmit-activate signal has been received, wherein amplifying is based on a predefined desired FMCW output transmission setting;

at a directional coupler, directing signals received from either the pulse transmitter or the FMCW transmitter to a lowpass filter (LPF); and at an isolator, directing signals received from the directional coupler to a load.

2. The method of claim 1, further comprising:

at the FMCW transmitter, increasing attenuation between an amplifier of the FMCW transmitter and the directional coupler when the controller sends a deactivate signal to the FMCW transmitter.

3. A system comprising:

a hybrid coupler configured to receive a signal produced by a synthesizer and couple the received signal to two output ports, the hybrid coupler comprising the two output ports;

a pulse transmitter attached to a first one of the two output ports of the hybrid coupler, the pulse transmitter configured to receive a pulse transmit-activate signal from a controller, receive an input signal from a first one of the two output ports of the hybrid coupler and amplify the received input signal if the pulse transmit-activate signal has been received, wherein amplifying is based on a predefined desired pulse output transmission setting;

a frequency-modulation continuous-wave (FMCW) transmitter attached to a second one of the two output ports of the hybrid coupler, the FMCW transmitter configured to receive an FMCW transmit-activate signal from the controller, receive an input signal from the other output port of the hybrid coupler; and amplify the received input signal based on a predefined desired FMCW output transmission setting if the FMCW transmit-activate signal has been received;

an isolator attached to the pulse transmitter; and a directional coupler comprising:

a first input port attached to the isolator;

a second input port attached to the FMCW transmitter an output port connected to a lowpass filter (LPF), wherein the directional coupler is configured to directing signals received from either the pulse transmitter via the isolator or the FMCW transmitter to the lowpass filter (LPF), wherein the isolator is configured to direct signals received from to the directional coupler to a load.

4. The system of claim 3, wherein the FMCW transmitter comprises:

an amplifier configured to receive signals from the hybrid coupler; and an attenuator configured to receive signals from the amplifier and send signals to the directional coupler, wherein the attenuator is instructed to increase attenuation when the controller sends a deactivate signal to the FMCW transmitter.

5. A system comprising:

a controller;

a hybrid coupler configured to receive a signal produced by a synthesizer and couple the received signal to two output ports, the hybrid coupler comprising the two output ports;

a pulse transmitter attached to a first one of the two output ports of the hybrid coupler, the pulse transmitter configured to receive a control signal from the controller;

a frequency-modulation continuous-wave (FMCW) transmitter attached to a second one of the two output ports of the hybrid coupler, the FMCW transmitter configured to receive a control signal from the controller;

an isolator attached to the pulse transmitter; and a directional coupler comprising:

a first input port attached to the isolator;

a second input port attached to the FMCW transmitter; and an output port connected to a lowpass filter (LPF).

6. The system of claim 5, wherein the FMCW transmitter comprises:

an amplifier configured to receive signals from the hybrid coupler; and an attenuator configured to receive signals from the amplifier and send signals to the directional coupler, wherein the attenuator is configured to receive a control signal from the controller.

* * * * *